(12) United States Patent
Hilton

(10) Patent No.: US 9,113,105 B2
(45) Date of Patent: Aug. 18, 2015

(54) RANDOMLY SELECTING CURRENT PROGRAMMING

(75) Inventor: David Gareth Hilton, West Yorkshire (GB)

(73) Assignee: EchoStar Technologies L.L.C., Englewood, CO (US)

( * ) Notice: Subject to any disclaimer, the term of this patent is extended or adjusted under 35 U.S.C. 154(b) by 721 days.

(21) Appl. No.: 12/327,977

(22) Filed: Dec. 4, 2008

(65) Prior Publication Data

US 2010/0146545 A1    Jun. 10, 2010

(51) Int. Cl.
| | |
|---|---|
| H04N 21/438 | (2011.01) |
| H04N 21/422 | (2011.01) |
| H04N 21/658 | (2011.01) |
| H04N 5/44 | (2011.01) |
| H04N 5/445 | (2011.01) |
| H04N 5/50 | (2006.01) |
| H04N 21/4415 | (2011.01) |
| H04N 21/45 | (2011.01) |
| H04N 21/475 | (2011.01) |
| H04N 21/431 | (2011.01) |

(52) U.S. Cl.
CPC ......... *H04N 5/4403* (2013.01); *H04N 5/44543* (2013.01); *H04N 5/50* (2013.01); *H04N 21/4221* (2013.01); *H04N 21/42222* (2013.01); *H04N 21/4383* (2013.01); *H04N 21/4415* (2013.01); *H04N 21/4532* (2013.01); *H04N 21/4755* (2013.01); *H04N 21/6582* (2013.01); *H04N 21/4312* (2013.01); *H04N 2005/4412* (2013.01)

(58) Field of Classification Search
CPC .................... H04N 21/4383; H04N 21/42222; H04N 21/4221; H04N 21/6582
USPC ............... 725/37–39, 46, 105, 131, 135, 139, 725/143, 151, 58
See application file for complete search history.

(56) References Cited

U.S. PATENT DOCUMENTS

| | | | | |
|---|---|---|---|---|
| 5,945,988 | A * | 8/1999 | Williams et al. | 715/747 |
| 6,040,829 | A * | 3/2000 | Croy et al. | 715/864 |
| 6,438,752 | B1 * | 8/2002 | McClard | 725/46 |
| 7,079,750 | B2 * | 7/2006 | Nomura et al. | 386/207 |
| 7,849,475 | B2 * | 12/2010 | Covell et al. | 725/22 |
| 7,861,267 | B2 * | 12/2010 | Haziza et al. | 725/46 |
| 2004/0019908 | A1 * | 1/2004 | Williams et al. | 725/46 |
| 2005/0015804 | A1 * | 1/2005 | LaJoie et al. | 725/44 |
| 2005/0108754 | A1 * | 5/2005 | Carhart et al. | 725/47 |
| 2007/0220554 | A1 * | 9/2007 | Barton et al. | 725/46 |
| 2009/0241144 | A1 * | 9/2009 | Lajoie et al. | 725/40 |

OTHER PUBLICATIONS

Goodin, Dan; "My IPod for a Random Playlist"; Sep. 19, 2005; online article, www.wired.com/entertainment/music/commentary/listeningpost/2005/09/68893.

* cited by examiner

*Primary Examiner* — Benjamin R Bruckart
*Assistant Examiner* — Jason Thomas
(74) *Attorney, Agent, or Firm* — Ingrassia Fisher & Lorenz, P.C.

(57) ABSTRACT

A system for receiving and displaying broadcast audio and visual programming includes a television receiver and a display. The television receiver has a tuner for tuning to the channel to be displayed and is controlled by a processor with which the user communicates by way of a remote control unit. Operation of a random button on the remote control unit causes the processor to initiate a random mode selection whereby the television receiver randomly selects and displays one of the broadcast channels received.

20 Claims, 7 Drawing Sheets

RANDOMLY SELECTING CURRENT PROGRAMMING

The present invention relates to a system and method for randomly selecting a current program to be presented.

BACKGROUND TO THE INVENTION

Television receivers, such as set-top boxes (STBs), receive and process transmissions comprised of audio/visual programming from broadcasters and output the programming to a communicatively coupled display, such as a television. The television receivers are typically controlled by a control device, such a remote control device. Thus, the remote control device controls the output of content presented by the display.

Users can spend a lot of time just looking through lists of programs, for example, on an electronic program guide, for a program they might be interested in. Because the vast variety of programs available can be overwhelming, many users tend to have a relatively small list of favorite programs to which they tune.

SUMMARY OF THE PRESENT INVENTION

The present invention seeks to provide a different way to select broadcast programming for presentation.

According to a first aspect of the present invention there is provided a method of randomly selecting a current program to be presented by a system for receiving and presenting broadcast audio/visual programming, the system having a user interface by means of which a user is able to select a program to be presented, the method comprising enabling the user to select a random mode by providing input to the system, and causing the system, in response to the selection of the random mode, to randomly select a program for presentation.

The invention also extends to a method of randomly selecting a current program to be presented by a system for receiving and presenting broadcast audio/visual programming, the system having a user interface by means of which a user is able to select a program to be presented, the method comprising enabling the user to select a random mode, and causing the system, in response to the selection of the random mode, to randomly select a program for presentation.

With embodiments of methods of the invention, the random mode can give the system the ability to randomly select one program from all of the hundreds of channels frequently provided within the broadcast audio/visual programming received. With the random mode, a user has no idea as to what the system will tune to and may be pleasantly surprised at what is presented. In any event, the method provides a different manner of selecting a program for presentation.

The program presented may be a radio program, or the system may choose to display a television program.

The method may be completely random. Alternatively, the method may further comprise storing information as to a user's preferences, and causing the system to select a program in accordance with those preferences.

By storing information as to a user's preferences, the method can be caused to select a program which the user knows he will enjoy, or can be caused not to select programs which the user knows he will not want to be presented.

In one embodiment, the method further comprises causing the system to collect a history of programs selected by way of the user interface, and to store information taken from the history as user preferences.

Additionally and/or alternatively, the method may further comprise enabling the user to input information about user preferences.

When the user inputs information about user preferences, it is generally preferred that information about categories, themes and/or programs which the user does not wish to have presented are input. This still enables the system to randomly select programs which the user might never have viewed previously, but which might provide a pleasant surprise.

If, additionally and/or alternatively, a history from the viewer's prior viewing is taken to identify, for example, programs of interest, the randomly selected program is likely to be a program familiar to, but liked by, the user.

Depending upon the system provided for receiving and presenting the broadcast programming, the input interface can be by any appropriate input means. Preferably, the user interface includes a remote control device, and the method further comprising enabling the user to select the random mode by operation of the remote control device.

In one embodiment, the remote control device is provided with a dedicated button or other switch means to activate the random mode. Operation of that button is enabled to cause the system to be switched to random mode and a program to be randomly selected for presentation as discussed above.

Where a remote control device does not have a dedicated random mode button or switch, and/or where the system has menus and/or an electronic program guide, the processor will be enabled to display menus or program lists including a random mode option, and/or to display a random mode icon. Operation of an appropriate button or switch on the remote control is then able to cause the random mode to be selected. For example, where the availability of the random mode is indicated on a screen of the presentation system, it can be selected by operation of the remote control to highlight and then select the option. Additionally, the option can be selected by depressing a particularly colored button, as in "Press the red button" to activate the random mode.

Our co-pending U.S. patent application Ser. No. 12/203,286 which was filed on 3 Sep. 2008, describes the provision in a remote control device of means to collect biometric data from individuals. This enables the remote control device to identify a user to the system. This prior system can be utilized with the present invention to identify a user to the system.

Where the user is identified to the system in any appropriate manner, the method may further comprise collecting and storing information about the identified user's preferences to inform the random selection of the program to be presented by the system.

If no user preferences, for example, are stored or used in the random selection of programming, the selection of programs for display can be truly random. However, the user may wish to define parameters, and these can be defined by use of the user interfaces to navigate various menus provided by the system.

The user may be able to select themes of programs which are to be excluded from selection. For example, the user can choose to exclude radio channels, sports channels or other types of channels according to their category or theme.

Additionally and/or alternatively, event information or keywords can be input to prevent the selection of known upcoming programs or categories of programs.

It is additionally and/or alternatively possible to exclude particular channels from selection.

A user might want a program to be selected only where it has not yet commenced and/or when there is only a short time before its commencement. In one embodiment, therefore, the method may further comprise only randomly selecting a program for presentation if the program has not commenced but is only minutes from its commencement.

Alternatively, the user may be enabled to input an acceptable time delay between the selection of a random program and its start time.

Additionally and/or alternatively, the system may be arranged to identify those randomly selected programs, or channels, which the user kept presented for some time, indicating that the user has viewed the program. The system can be enabled to learn that this is an acceptable program, to similarly learn from the viewing habits generally, and to construct a database of information about programming which the user might enjoy and to use that database to inform the random selections. Such a learn feature could be arranged to be selected or switched off.

It will be appreciated that other means for informing the selection of programs so that they much nearer meet the user's preferences can be utilized.

Whilst the method as defined above will most usually be made to select current programming as it is received, the random mode selection can also include any stored content in the system.

According to a further aspect of the present invention there is provided a system for randomly selecting a current program to be presented, the system comprising means arranged to receive and present broadcast audio/visual programming, processor means to control the operation of the system, and at least one user interface, wherein, in response to a program selection by way of a user interface, the processor means causes that selected program to be presented, and wherein the system further comprises selector means operable by a user, the processor means being arranged, in response to operation of the selector means, to cause a randomly selected program to be presented.

The invention also extends to system for randomly selecting a current program to be presented, the system comprising:
   at least one tuner,
   at least one presentation means,
   at least one user interface, and
   at least one processor,
   wherein the processor is arranged to control the operation of the system such that, in response to the input of a program selection by way of the user interface, the tuner is caused to tune to that selected program, and the presentation module is caused to present that selected program, and
   the system further comprising
   a selector operable by a user,
   the processor being arranged, in response to the operation of the selector, to cause a randomly selected program to be tuned and presented.

The system may be arranged to receive and present broadcast audio/visual programming. The presentation module may comprise loudspeaker means for presenting radio programs and the audio content of television programs. The presentation module may also comprise display means to display television programs.

A system of the present invention may comprise a display incorporating processor means, and/or may comprise a display with a digital television receiver. The system may additionally and/or alternatively be a computer with a monitor.

Generally, the system will have tuning means, presentation means, at least one user interface, and processor means. These devices may be provided as single units or may be distributed across the elements of the system.

Preferably, the system further comprises memory in which information as to a user's preferences can be stored, the processor means being arranged to cause the system to randomly select a program in accordance with the user preferences which are stored in memory.

In an embodiment, the processor means is arranged to collect a history of programs selected by way of the user interface, and to store in memory information taken from the history as user preferences.

Additionally and/or alternatively, a user is enabled to input information about the user's preferences by way of the user interface, and the processor means causes the input information to be stored in memory.

The user interface may comprise a remote control device able to communicate with the processor means. The presentation module or means comprises a display for displaying programming. The presentation means also comprises loudspeaker means.

In a preferred embodiment, at least one user interface comprises a remote control device able to communicate with the processor means, and wherein the user operable selector is a dedicated button or switch means provided on the remote control device.

Additionally and/or alternatively, the user operable selector is provided by a button or switch means on the remote control device operable to respond to on screen instructions displayed by means of the processor means on the display means.

In one embodiment, the remote control device includes a biometric reader arranged to collect biometric data from a user and to provide the biometric data to the processor to identify the user.

For example, the processor may be arranged to store user preferences in memory in association with the identification of the user.

This embodiment enables, for example, several users of the same system to have their user preferences stored within the system with their identification. When a particular user, therefore, operates the system by way of the remote control device the user is identified to the system. In this manner, any use of the random mode feature will provide programs more likely to appeal to the identified user where the selection is made in association with stored user preferences for that user.

BRIEF DESCRIPTION OF THE DRAWINGS

Preferred embodiments of the present invention will hereinafter be described, by way of example, with reference to the accompanying drawings in which.

DESCRIPTION OF PREFERRED EMBODIMENTS

The present invention is concerned with the random selection of audio/visual programming. It will usually be utilized in conjunction with a display having a digital control device. In the main, and as set out below, we refer to the control of a television receiver for a display. However, it will be understood that the television receiver comprehends any digital device able to impart functionality to the display whether provided in a stand-alone box, incorporated in a stand-alone box along with other devices, or integrated within the display.

Generally, the description is concerned with the selection of programming being broadcast and received in real time by the system. However, it would be possible, where the system has the facility to store recorded content, to include the recorded content amongst the programs to be offered to the user.

Figure 1:
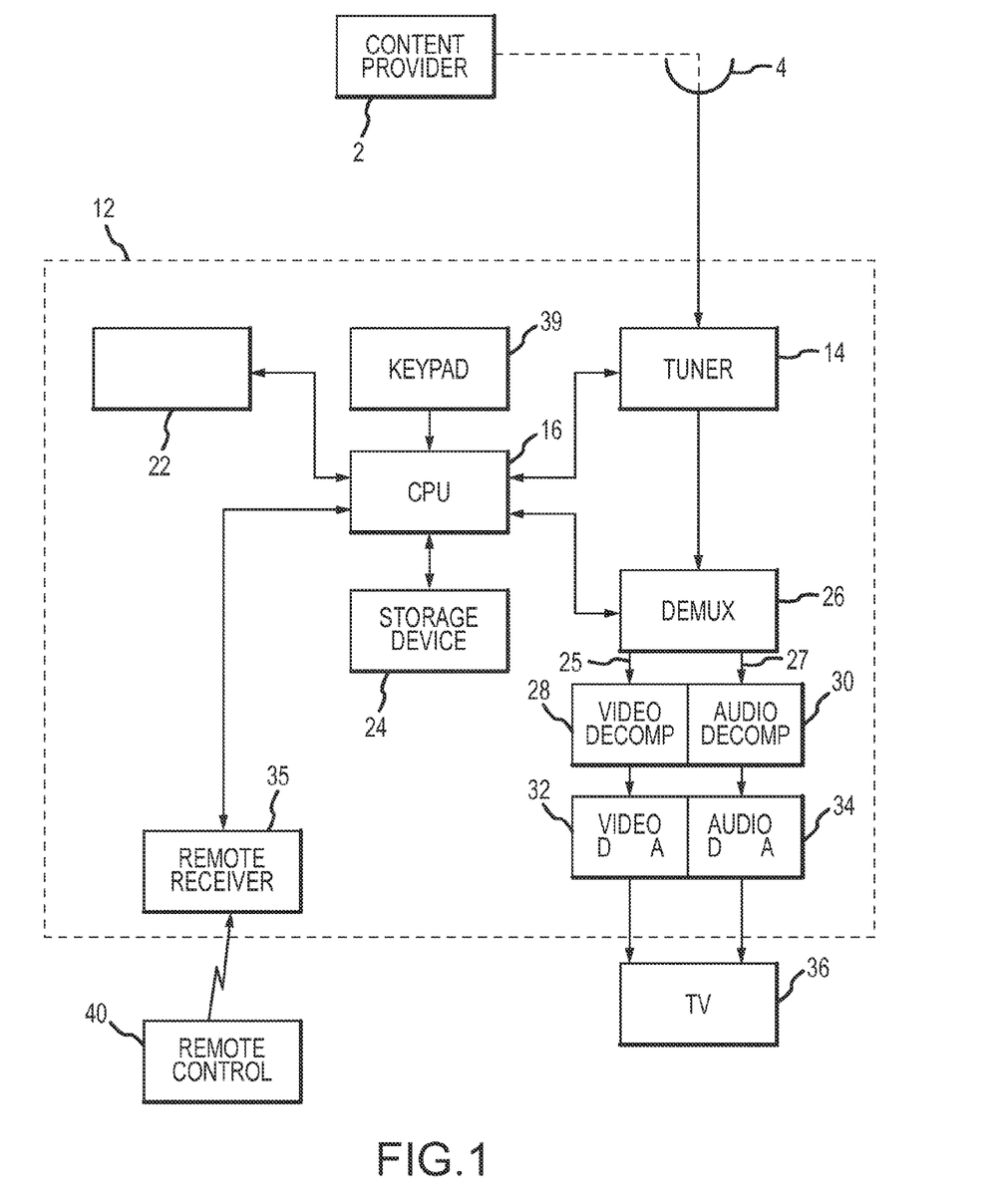
FIG. 1 shows a block diagram of one example of a system for receiving broadcast programming and comprising a display and a television receiver.

FIG. 1 shows one example of the provision of broadcast audio/visual programming to a domestic user having a television receiver 12 coupled to a display 36. The display 36 will have a monitor or display screen and loudspeakers and is able to present television or radio programs. For example, the display 36 may comprise a television. Content from a content provider 2 is broadcast and is received by the user by way of a satellite antenna 4.

Of course, it will be appreciated that this invention is not limited to the type of equipment which the user has nor to the type of broadcasts he receives. Thus, the user might receive content by terrestrial broadcasts as well as from a subscription service provided by satellite or cable. The functionality provided, in the illustrated example, in the television receiver 12 may additionally and/or alternatively be provided within the display 36 itself.

The user may optionally use a computer to receive broadcast programming, or may receive the programming by way of the internet. The presentation means, including a display and loudspeakers, may be provided separately from the computer and/or from the display.

All of these various options are within the scope of the present invention. However, the particular arrangement illustrated using a television receiver 12 and a display 36, with presentation means, will now be described to exemplify the present invention.

In the arrangement shown in FIG. 1, the television receiver 12 has a tuner 14 which is able to tune to a specific channel amongst the many channels received from the antenna 4. In the embodiment shown, the selected channel is fed by way of a demultiplexer 26 to video and audio decompressors 28 and 30 and then to video and audio digital to analog convertors 32 and 34. Thus, decompressed analog video and decompressed analog audio is fed to the display 36 for presentation by the speakers and by the display thereof. It will be appreciated that the tuning and decompression sequence as illustrated is conventional.

The choice of the channel to which the tuner 14 tunes is controlled by a processor 16 which receives input from the user. In the embodiment illustrated, the user interface includes both a keypad 39 and a remote control unit 40 whose signals are fed to the processor 16 by way of a remote receiver 35. In known manner, a user indicates the channel to be presented by the display 36, either by use of the remote control unit 40 or by use of the keypad 39. The processor 16, having received the user instruction, controls the circuit elements to present the selected channel, for example, to display a chosen television program.

The television receiver 12 shown in FIG. 1 also includes a storage device 24. This may be a hard drive, for example, provided to record and store selected channels either as they are displayed or at an earlier time for later display.

The television receiver 12 also includes storage means 22. The storage means 22 comprises memory in which an electronic program guide EPG is stored. As is well known, an electronic program guide includes a database containing information as to the names or titles of programs or video events, corresponding channel numbers and names, brief descriptions of the programs and events, and their start and finish times. Upon the receipt of a user request, for example, by way of the remote control unit 40, part of the electronic program guide can be displayed on the display of the display 36. The particular program the user wishes to watch is then accessed by highlighting the program concerned on the display and selecting it by way of the remote control device 40. The processor 16 will then cause the tuner 14 to tune to that program so that it is presented by way of the display 36.

The particular manner in which a user is able to identify and have the system tune to a particular channel will, of course, vary in accordance with the details of the system provided. These details do not comprise part of the invention and FIG. 1 and the description of its operation are exemplary only.

When choosing broadcast programs to be presented by a display, as 36, a user may display part of the electronic program guide to select a particular program to watch or listen to. However, systems as shown in FIG. 1 frequently have access to more than one thousand programs. Users frequently spend time "surfing" through channels simply to find something new to watch or to check that there is nothing more interesting than the program they had previously selected.

The present invention provides a new way of selecting programming to be presented and provides a random feature by means of which the television receiver 12 tunes to a random channel. The random feature may be completely random in the sense that the selected channel is determined solely by the operation of the system. Alternatively, a user can input a set of rules to be used.

The random feature, which might be referred to as a "Surprise Me" feature, can be activated by pressing a dedicated switch, key or button on the remote control unit 40, and/or by selecting an icon displayed on the display 36 by the television receiver 12, and/or from within the electronic program guide.

Figure 2:
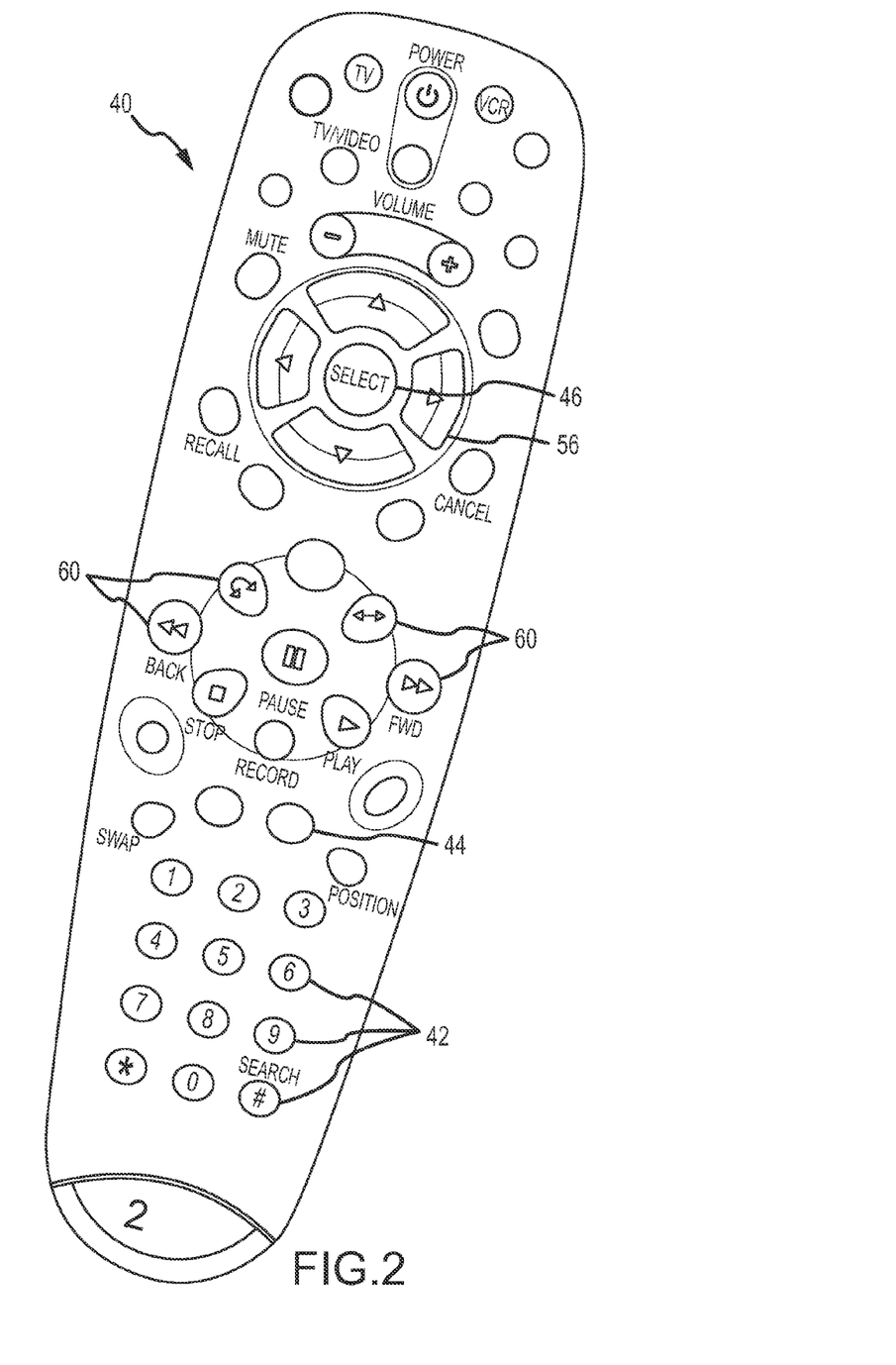
FIG. 2 shows a remote control unit.

FIG. 2 shows an example of a remote control unit 40. As is common it is provided with a number of depressible buttons 42 by means of which the user is able to signal to the television receiver 12. These buttons 42, which may be replaced by keys, or other switch means, include a select button 46 and scroll keys 56. It is also usual to include four colored buttons 60, usually colored red, green, yellow and blue. In the embodiment shown in FIG. 2, a dedicated "Surprise Me" button 44 is also provided. If, at any time, the user depresses the button 44, the television receiver 12 will revert to the random mode. In the absence of any user defined rules, as described below, the television receiver 12 will function to randomly select a program to be presented by the display 36. The processor 16, for example, may incorporate a random number generator which will be operated upon depression of the button 44 and this will set the parameters for selecting a channel by way of the tuner 14.

Figure 3:
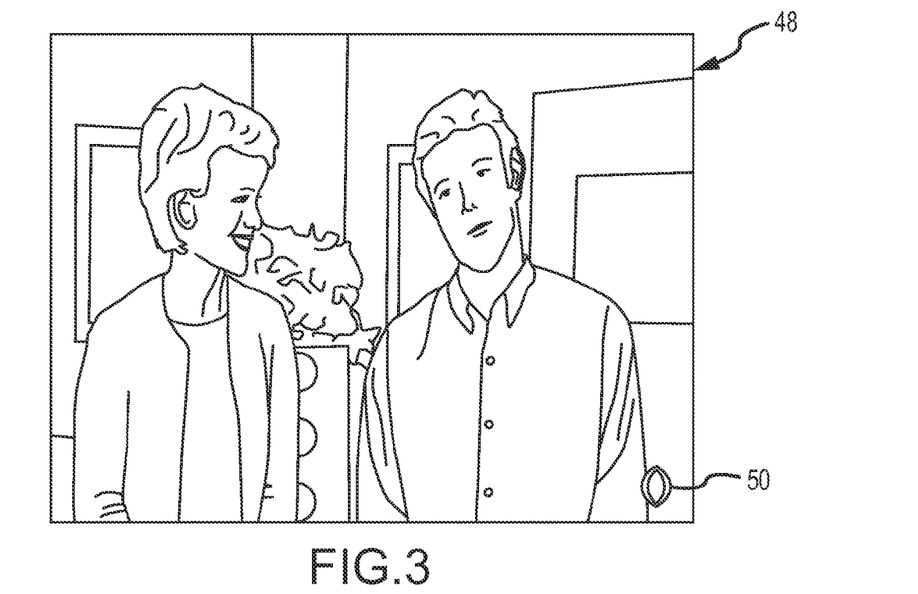
FIG. 3 shows the screen of a display with an icon for selecting random mode.

Instead of providing a dedicated button 44, it is alternatively possible to use the select button 46 which is generally provided on a remote control unit. FIG. 3 shows a display 48 of the display 36 on which is displayed a television program. As can be seen in FIG. 3, an icon 50, the "Surprise Me" icon, is displayed on the screen. When that icon is displayed, depression of the select button 46 of the remote control unit 40 switches the television receiver into "Surprise Me", or random mode, such that the television receiver 12 randomly tunes to a new channel.

The icon 50 might be displayed on the display 48 for a set time after a channel change, or constantly, or at regular intervals. The user may be given the option to determine the icon display time or even to deactivate the icon.

Figure 4:
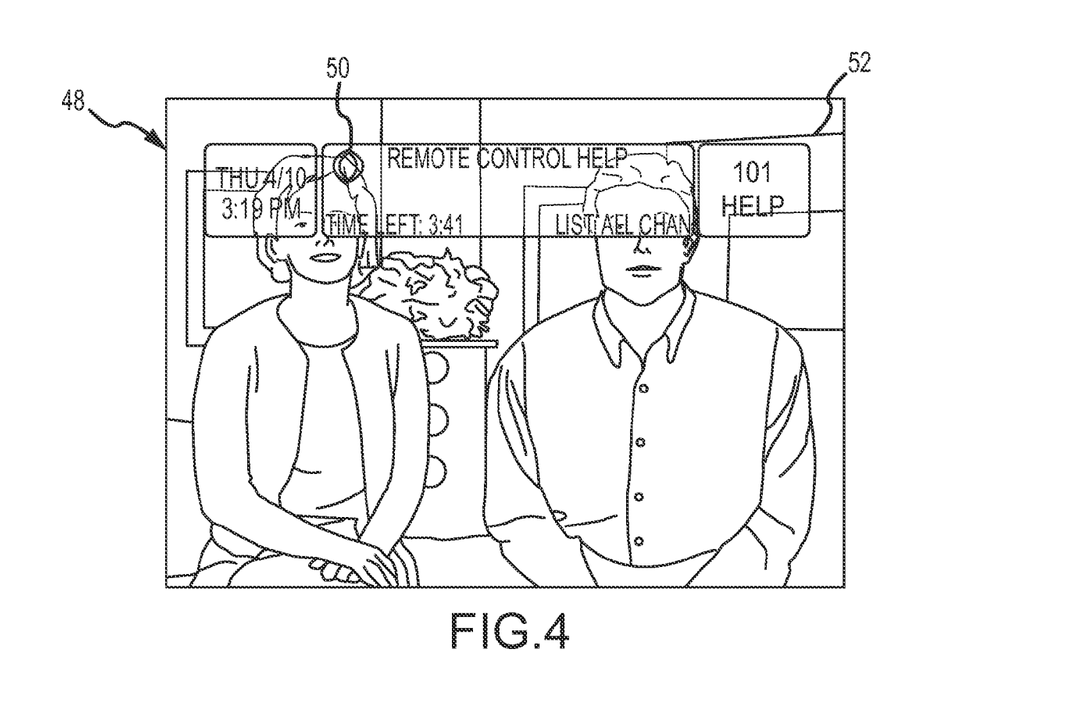
FIG. 4 shows a screen with a view banner.

FIG. 4 shows the view on the display screen 48 when a channel change has taken place. In the view shown in FIG. 4, a banner 52 confirming the details of the program or channel to which the tuner has just tuned is briefly displayed on screen. The provision of such a banner 52 is well known and it generally remains on screen for approximately 10 seconds after a channel change.

In the embodiment shown in FIG. 4, an icon 50, representative of the random mode, is included within the view banner. It can be arranged that depression of the select button on the remote control unit 40, whilst the icon 50 is displayed within the view banner 52, will execute the random mode feature.

Figure 5:
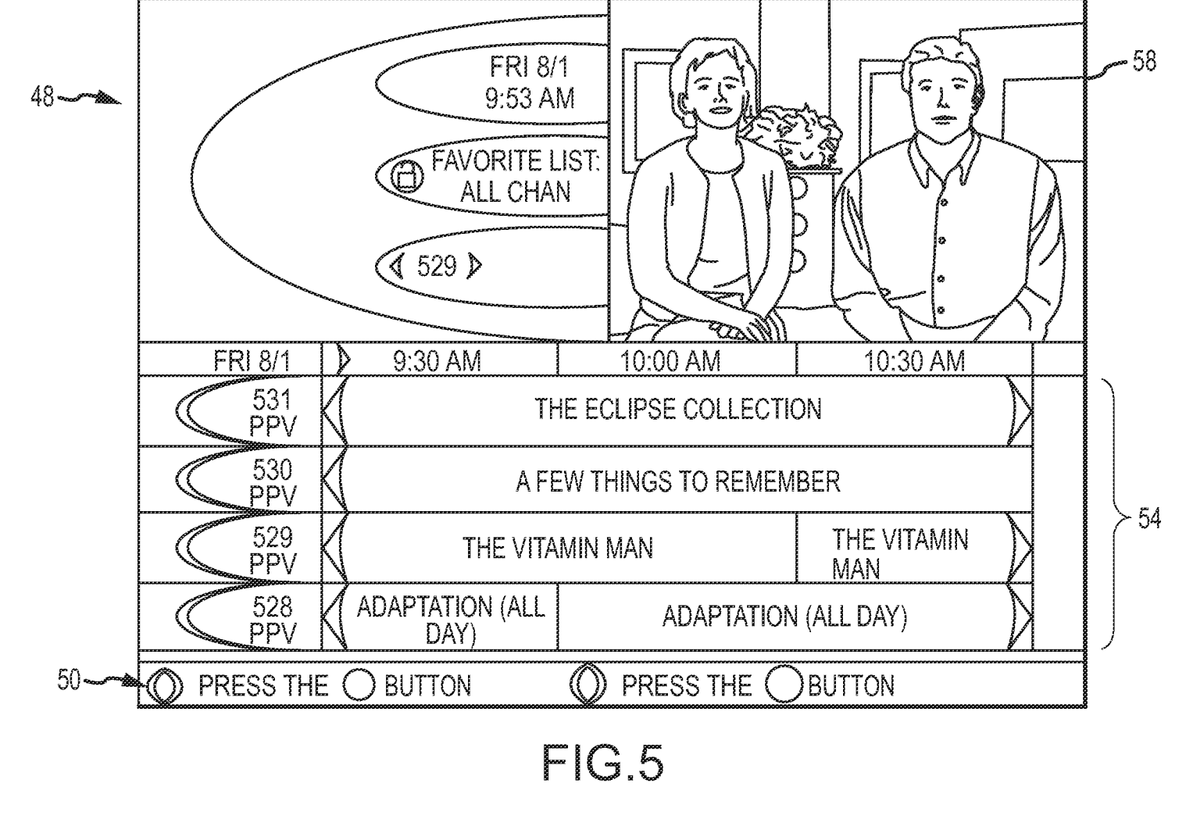
FIG. 5 shows the screen of a display illustrating an electronic program guide.

FIG. 5 shows the use of the random mode feature within the electronic program guide. Thus, in FIG. 5 there is shown the material displayed on the display screen 48 when the electronic program guide feature is selected. As is known, the electronic program guide will display a list 54 of channels which may be selected. Use of scroll keys 56 on the remote control unit 40 enables the viewer to scroll through the electronic program guide by type or to scroll through further lists of channels. When a channel to view has been determined it is selected by ensuring it is highlighted and then by depressing the select button 46. Thus, when utilizing the electronic program guide, selection of the random mode is not generally possible by way of the select button 46. Accordingly, and as is illustrated, a "Surprise Me" or random icon 50 is indicated within the electronic program guide. In the embodiment shown in FIG. 5 the icon 50 is displayed alongside the inducement to "Press the red button". It is arranged that if the red button 60 provided on the remote control unit is depressed the random feature is selected.

Rather than simply displaying a program randomly when the random feature is selected within the electronic program guide, it can be arranged that details of the program which has been randomly selected are initially displayed. In this respect, as is shown in FIG. 5, display of the electronic program guide also include display of the highlighted program in a preview screen 58. Thus, in this context, consider that selecting the random mode has selected a program "The Vitamin Man" which, as shown in FIG. 5, is initially displayed in the preview screen 58 only. The user can then select that program in the usual way, that is, by pressing the select button 46, for further viewing. All other options available from the electronic program guide for that program will also remain available. Thus, the electronic program guide may allow a user to read information about the program, tune to the program, or set a recording of the program so that it is stored in the storage device 24 in the television receiver 12.

Figure 6:
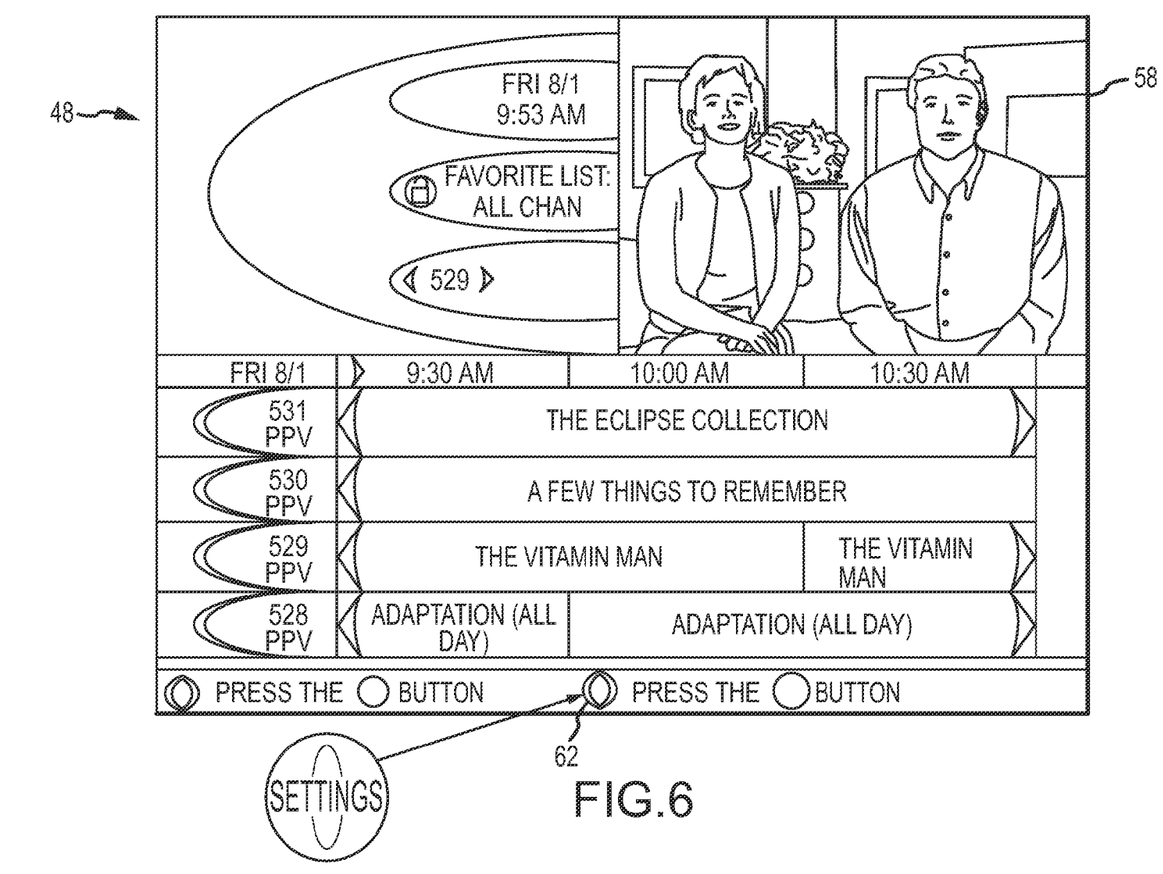
FIG. 6 shows a screen as in FIG. 5 but with icons for selecting functions.
Figure 7:
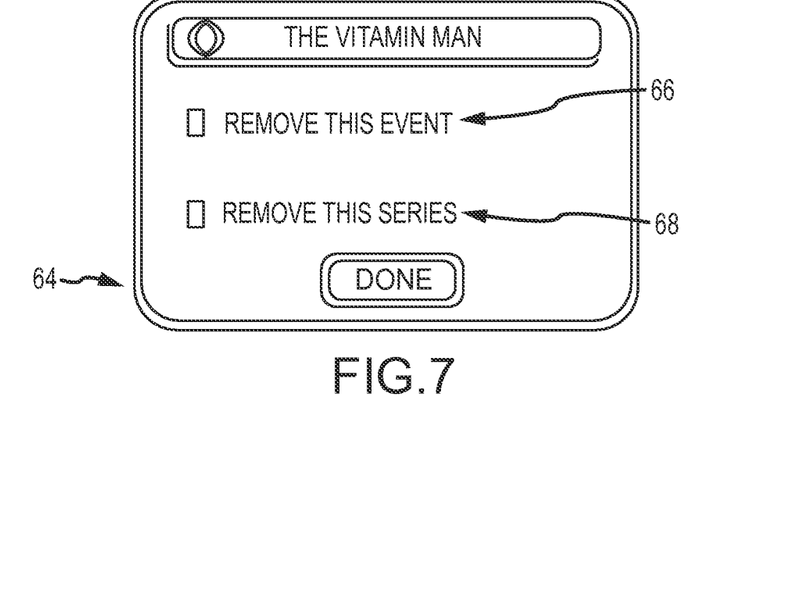
FIG. 7 shows a pop up screen displayed when a function indicated in FIG. 6 is selected.

As is discussed below, the invention enables the user to provide rules to configure the remote feature. The television receiver 12 can also learn from selections of the user. FIG. 6 shows the display appearing on the display screen 48 upon activation of the random mode by pressing the red button. The film "The Vitamin Man" has been selected and is shown in the preview screen 58. There is also provided an edit icon 62 which is actuated by pressing the green button 60. Pressing the green button displays a pop up 64 as shown in FIG. 7. This pop up 64 can be displayed on screen 48, overlaid on the existing picture of FIG. 6, or can be presented separately to replace the picture which was on screen 48. The pop up 64 provides two options. There is an option 66 which may be highlighted and which removes the event, and an option 68 which removes the series. Alternatively, the user can return to the original picture on screen 48 without taking any action.

The options 66 and 68 on the pop up 64 are navigated by the scroll keys 56 of the remote control unit and once the correct option has been highlighted the select key is operated. If the "Remove this event" option 66 is selected, the program "The Vitamin Man" will not be tuned to during this time period. Thus, the user could execute the random feature a number of times during the period 9.30 am to 10.30 am during which the program is showing and it would never be one of the options displayed. If the option 68 "Remove this series" is selected, the program would never be tuned to by use of the random feature.

As described so far, the random feature is totally random except that single programs randomly selected, and found not to be to the user's taste can be switched off, and/or removed from future selection.

It is, however, possible for the user to define a set of rules, or preferences to inform the random selection. When that has been done, the first press of the random button 44, or selection of the icon 50, is likely to select the user's most preferable type of program. Each subsequent execution of the random feature is likely to produce a lesser match to the user's preferences. The random mode will continue selecting on a random basis, but controlled by the user set preferences, until the channel list has been exhausted, when the system would reset and start again.

Figure 8:
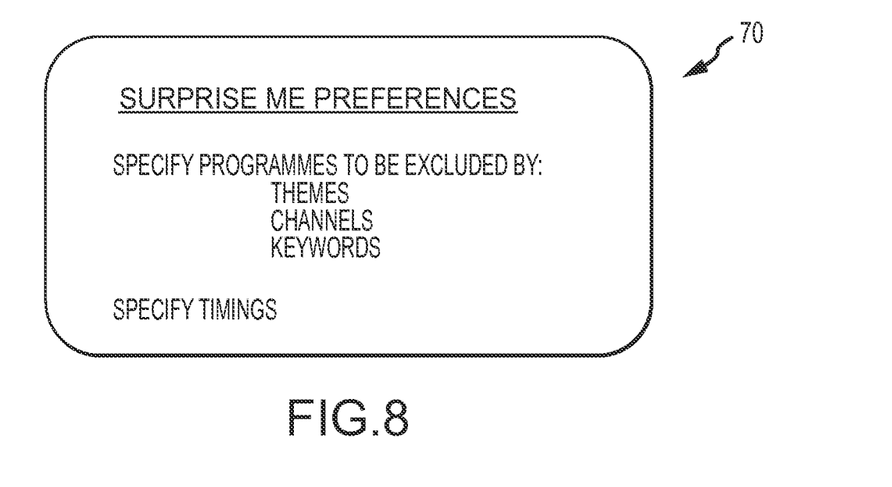
FIG. 8 shows a preference screen which may be displayed.

To set user preferences, options are displayed on the display 48 as preference screens to enable user input. The provision of menus and hierarchical sub-menus to enable user input and selection in this manner is well known. FIG. 8 shows a preference screen 70 enabling a user to specify programs to be excluded from those chosen randomly by themes, channels or keywords. It also enables a user to specify timings.

Figure 9:
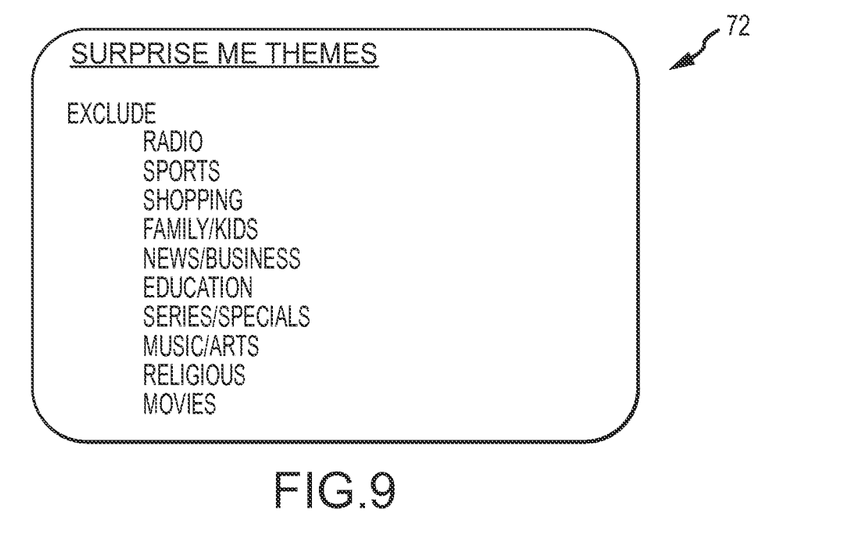
FIG. 9 shows a preference screen giving a choice of themes for a user.

If the user were to highlight and select "Themes" from the preference screen 70 of FIG. 8 he would be taken to the choice of themes screen 72 shown in FIG. 9. This screen 72 gives a list of themes which can be excluded from selection during use of the random mode. If the user wishes to exclude, for example, radio channels and shopping channels, he sequentially highlights those two themes on the screen 72 and then sequentially selects them.

In a similar manner, highlighting the "Channels" section on the preference screen 70 would lead to a screen enabling channels to be excluded by channel number. The "Keywords" selection may include an option for a user to add one or more keywords describing events which should not be tuned to. These keywords would be the same as those in an event information table transmitted by a network provider. For example, if a user were to enter the keywords "Jerry Springer" then during use of the random feature, the television receiver 12 will not tune to any channel showing "The Jerry Springer Show".

Figure 10:
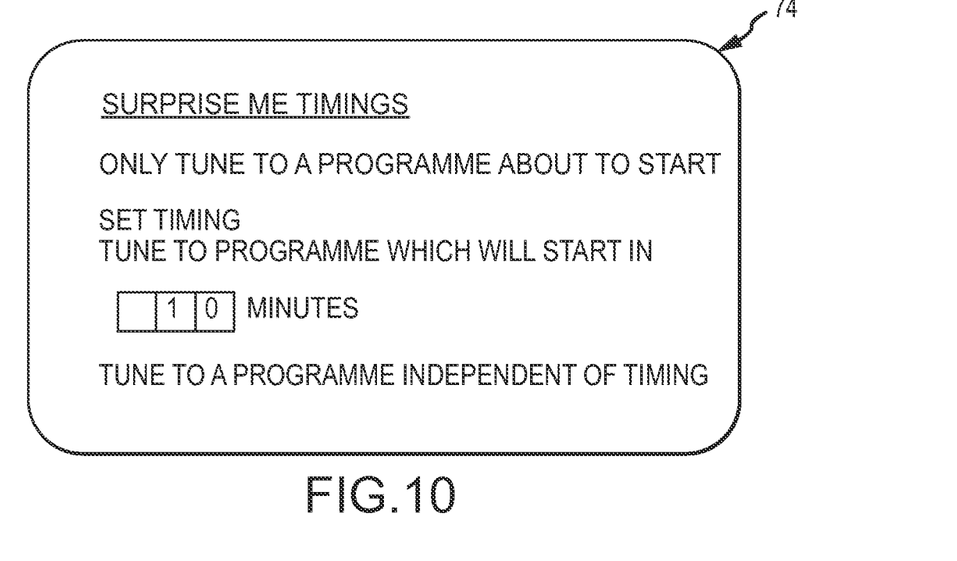
FIG. 10 shows a timing preference screen which may be displayed.

As shown on the preference screen 70 of FIG. 8, a user may also specify timings as illustrated in FIG. 10. FIG. 10 shows a timing preference screen 74. Using this screen 74 and the remote control unit, the user can choose the option that the random mode will only tune to a program about to start. Alternatively, the user can select the option to tune to a program which will start in a number of minutes and then set the number of minutes for which the user is prepared to wait until the start of the program. The final option is to tune to a program independent of timing. With this third option, the random selection will go to any program regardless of whether it has been running for some time or is halfway through.

It can be arranged that the television receiver learns the preferences of the viewer, for example, by noting favorite channels accessed during normal viewing. This information can be used to educate the choice of programs during random selection and to select, for example, a favorite as one of the first choices during random selection. The user can deactivate this learning feature, if it is not required.

In our co-pending U.S. patent application Ser. No. 12/203,286 filed on 3 Sep. 2008 there is described a remote control device which is able to provide an identification of a user to the television receiver. This can be used with the present invention, for example, so that user preferences can be stored for individual users. Then, activation of the random mode will produce a different selection of programs depending upon the user who has asked for the random mode.

The use of the random mode is not confined to the selection of broadcast programs as they are received by the television receiver 12. If required, any programs stored on the storage device 24 may also be amongst the collection of programs to be randomly selected.

It will be appreciated that variations in and modifications of the embodiments as described and illustrated may be made within the scope of this invention as defined by the attached claims.

The invention claimed is:

1. A method of randomly selecting a current program to be presented by a system for receiving and presenting broadcast audio/visual programming, the system storing information as to a user's preferences and having a user interface configured to allow a user to select a program to be presented, the method comprising enabling the user to select a random mode by providing input to the system, and causing the system, in response to the selection of the random mode, to set parameters enabling the system to totally randomly select a program for presentation from all of the broadcast audio/visual programming that is available to the system, the method further comprising tuning only to a randomly selected program such that the program randomly selected for presentation is selected from only those programs that have not yet commenced but are about to start, with a maximum wait time of ten minutes before commencement, and which has not been identified in the stored user preferences as a program to be excluded from presentation, wherein after tuning the randomly selected program is presented until further user input is provided.

2. A method of randomly selecting a current program to be presented according to claim 1, further comprising storing information as to a user's preferences, and causing the system to select a program in accordance with those preferences.

3. A method of randomly selecting a current program to be presented according to claim 2, further comprising causing the system to collect a history of programs selected by way of the user interface, and to store information taken from the history as user preferences.

4. A method of randomly selecting a current program to be presented according to claim 2, further comprising enabling the user to input information about the user's preferences.

5. A method of randomly selecting a current program to be presented according to claim 1, wherein the user interface includes a remote control device, and the method further comprising enabling the user to select the random mode by operation of the remote control device.

6. A method of randomly selecting a current program to be presented according to claim 5, wherein the remote control device is enabled to identify a user to the system, the method further comprising collecting and storing information about the identified user's preferences to inform the random selection of the program to be presented to be made by the system.

7. A method of randomly selecting a current program to be presented according to claim 1, further comprising accepting user inputs from the user to adjust the time from selection to commencement of the program randomly selected for presentation.

8. A system for randomly selecting a current program to be presented, the system comprising:
   at least one tuner,
   at least one presentation module,
   at least one user interface;
   a memory configured to store information as to a user's preferences; and
   at least one processor arranged to control the operation of the system such that, in response to the input of a program selection by way of the user interface, the tuner is caused to tune to that selected program, and the presentation module is caused to present that selected program, and wherein the processor is configured to respond to a user input received via the user interface by randomly selecting a program to be presented by the presentation module from all of the broadcast audio/visual programming that is received, and wherein the tuner tunes only to a randomly selected program which has not yet started such that the program randomly selected for presentation is selected from only those programs that have not yet commenced but that are about to start, with a maximum wait time of ten minutes before commencement, and wherein the tuner only tunes to the randomly selected program if the randomly selected program has not been identified in the stored user preferences as a program to be excluded from presentation, and wherein after tuning the randomly selected program is presented until further user input is provided.

9. A system for randomly selecting a current program to be presented according to claim 8, wherein the processor is arranged to cause the system to randomly select a program in accordance with the user preferences which are stored in memory.

10. A system for randomly selecting a current program to be presented according to claim 9, wherein the processor is arranged to collect a history of programs selected by way of the user interface and to store in memory information taken from the history as user preferences.

11. A system for randomly selecting a current program to be presented according to claim 9, wherein a user is enabled to input information about the user's preferences by way of the user interface, and the processor causes the input information to be stored in memory.

12. A system for randomly selecting a current program to be presented according to claim 8, wherein the at least one user interface comprises a remote control device able to communicate with the processor, and wherein the user operable selector is a dedicated button or switch provided on the remote control device.

13. A system for randomly selecting a current program to be presented according to claim 12, wherein the remote control device includes a biometric reader arranged to collect biometric data from a user and to provide the biometric data to the processor to identify the user.

14. A system for randomly selecting a current program to be presented according to claim 13, wherein the processor is arranged to store user preferences in memory in association with the identification of the user.

15. A system for randomly selecting a current program to be presented according to claim 8, wherein the at least one user interface comprises a remote control device able to communicate with the processor, wherein the presentation module comprises a display for displaying programming, and wherein the user operable selector is provided by a button or switch on the remote control device operable to respond to instructions displayed by means of the processor on the display.

16. A system of claim 8 wherein the processor comprises a random number generator configured to randomly select the program to be tuned by the tuner.

17. A system of claim 8 wherein the user interface is an interface to a selector that is operable by the user and that comprises a button dedicated to generating the user input that directs the processor to randomly select the program to be tuned by the tuner.

18. A method of selecting a program to be presented by a system, the system having a remote control interface that is configured to allow a user to select a program to be output by the system for presentation, the method comprising:
  receiving broadcast television programming at the system;
  receiving a user input from the remote control;
  in response to the user input, totally randomly selecting one of a plurality of currently-broadcast programs from all of the broadcast television programming that is received, wherein the randomly selected currently-broadcast program is selected based upon a random number generator and from only those programs that have not yet commenced but that are about to start, with a maximum wait time of ten minutes before commencement, and that are not identified in stored user preferences as programs to be excluded from presentation;
  adjusting a tuner to receive the randomly-selected program; and
  outputting the randomly-selected program for viewing by the user, wherein the outputting continues until further user input is provided.

19. The method of claim 18 wherein the randomly-selected program is output for viewing by the user while the randomly-selected program is being broadcast.

20. The method of claim 18 wherein the outputting stops after the further user input is provided.

* * * * *